United States Patent
Hong

(10) Patent No.: US 11,412,852 B2
(45) Date of Patent: Aug. 16, 2022

(54) PLANAR EXTERIOR PIPE RACK SYSTEM, AND PLANAR EXTERIOR FORMING SQUARE RACK PIPE AND RACK PIPE CONNECTING SQUARE JOINT WHICH CONSTITUTE PLANAR EXTERIOR PIPE RACK SYSTEM

(71) Applicant: G.S.ACE INDUSTRY CO., LTD., Gyeonggi-do (KR)

(72) Inventor: Yeon-tak Hong, Gyeonggi-do (KR)

(73) Assignee: G.S.ACE INDUSTRY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/045,162

(22) PCT Filed: May 30, 2018

(86) PCT No.: PCT/KR2018/006135
§ 371 (c)(1),
(2) Date: Oct. 3, 2020

(87) PCT Pub. No.: WO2019/203388
PCT Pub. Date: Oct. 24, 2019

(65) Prior Publication Data
US 2021/0153652 A1    May 27, 2021

(30) Foreign Application Priority Data
Apr. 17, 2018 (KR) .......................... 20-2018-0001683

(51) Int. Cl.
*A47B 96/14*    (2006.01)
*A47B 47/00*    (2006.01)

(52) U.S. Cl.
CPC .......... *A47B 96/1433* (2013.01); *A47B 47/00* (2013.01); *A47B 96/1475* (2013.01)

(58) Field of Classification Search
CPC . A47B 96/1433; A47B 47/00; A47B 96/1475; A47B 47/0008; A47B 47/0016;
(Continued)

(56) References Cited

U.S. PATENT DOCUMENTS

| 6,223,917 B1 | 5/2001 | Bruder | |
| 8,403,431 B2 * | 3/2013 | Elkins | H05K 7/186 |
| | | | 312/265.1 |
| 2002/0114659 A1 | 8/2002 | Binna et al. | |

FOREIGN PATENT DOCUMENTS

| KR | 20-0273496 | 4/2002 |
| KR | 10-2013-0124871 | 11/2013 |

(Continued)

OTHER PUBLICATIONS

International Search Report for PCT/KR2018/006135 dated Jan. 17, 2019 and its English translation from WIPO (now published as WO2019/203388).
(Continued)

*Primary Examiner* — Devin K Barnett
(74) *Attorney, Agent, or Firm* — Ladas & Parry, LLP

(57) ABSTRACT

Disclosed is a planar exterior forming square rack pipe, which comprises a rack pipe main body, a joint coupling protrusion part, and a plane forming member, and thus the outer surfaces of the planar exterior forming square rack pipes can be simply formed as a plane without operations such as the attachment of a separate member, such that the coupling of additional objects to the outer surface of the planar exterior forming square rack pipe such as the assembly of a planar panel, the mounting of a shock absorber, the mounting of a name plate, and the fastening of angles is simplified, assembly and mounting for the coupling of the additional objects can be completely carried out, and external foreign material such as dust can be blocked, and the rigidity of the exterior of the planar exterior forming square
(Continued)

rack pipe can be reinforced relatively more than that of a conventional rack pipe having a curved shape so as to allow the rack pipe to be used as a pillar for supporting heavy materials or receiving a heavy load, thereby enabling stable support.

2 Claims, 21 Drawing Sheets

(58) Field of Classification Search
CPC . A47B 47/003; A47B 47/0041; A47B 47/005; A47B 47/0058; A47B 47/0091; A47B 47/027; A47B 47/047
See application file for complete search history.

(56) References Cited

FOREIGN PATENT DOCUMENTS

| KR | 10-2016-0111905 | 9/2016 |
| KR | 20-2017-0003978 | 11/2017 |

OTHER PUBLICATIONS

Written Opinion of the International Searching Authority for PCT/KR2018/006135 dated Jan. 17, 2019 and its English machine translation by Google Translate (now published as WO2019/203388).

* cited by examiner

PLANAR EXTERIOR PIPE RACK SYSTEM, AND PLANAR EXTERIOR FORMING SQUARE RACK PIPE AND RACK PIPE CONNECTING SQUARE JOINT WHICH CONSTITUTE PLANAR EXTERIOR PIPE RACK SYSTEM

CROSS-REFERENCE TO RELATED APPLICATIONS

The present application is the U.S. National Phase of PCT Application No. PCT/KR2018/006135 filed on May 30, 2018, which claims the priority to Korean Patent Application No. 20-2018-0001683 filed on Apr. 17, 2018, the entire contents of which are incorporated herein by reference.

TECHNICAL FIELD

The present disclosure relates to a planar exterior pipe rack system and a planar exterior forming rectangular rack pipe and a rack pipe connecting rectangular joint constituting the planar exterior pipe rack system.

BACKGROUND ART

A pipe rack system refers to a system able to form a rack or the like freely in a variety of shapes according to the conditions of industrial sites or the like, to which the rack is applied, from a plurality of rack pipes using a connecting joint.

Such a rack system providing an industrial rack is a system able to freely form an industrial structure that needs to be assembled by forming rack pipes from stainless steel, aluminum, or the like or coating steel pipes with plastic and then assembling the rack pipes using pipe connecting joints having a variety of shapes. The rack system is also referred to as an erector or a pipe racking system.

An example of such a pipe rack system, titled "INDUSTRIAL RACK FORMING RACK SYSTEM AND PIPE JOINT USED IN THE INDUSTRIAL RACK FORMING RACK SYSTEM", disclosed in Korean Utility Model Publication No. 20-2017-0003978 (published on Nov. 24, 2017), has been proposed.

However, in the related-art pipe rack system, each of the rack pipes has an overall shape of a hollow cylinder having a circular cross-section, such that the outer shape of the rack pipe is curved. Thus, it may be inconvenient to perform an operation of, for example, fitting a planar panel, mounting an absorber or a name plate, or fastening an angle to the outer surface of the curved rack pipe, or it may be essential for the fitting or mounting to be imperfectly performed. In addition, it is problematic in that foreign matter may be accumulated on a protrusion of the curved outer surface, to which a pipe connecting joint is coupled.

In order to overcome such problems, a rectangular profile plate having the shape of a planar plate may separately be coupled to the rack pipe. In this case, separately coupling the rectangular profile plate to the rack pipe is not only difficult but also time-consuming, is problematic. Even in the case that the rectangular profile plate is disposed, there is another problem that foreign matter may not be properly blocked.

In addition, in the related-art pipe rack system, the strength of the rack pipe may be insufficient, since the rack pipe may have the overall shape of a hollow cylinder. Therefore, the rack pipe may not be used as a column for supporting heavy-weight materials or bearing a large load, which is problematic.

DISCLOSURE

Technical Problem

Accordingly, the present disclosure has been made in consideration of the above-described problems occurring in the related art, and an objective of the present disclosure is to provide a planar exterior pipe rack system and a planar exterior forming rectangular rack pipe and a rack pipe connecting rectangular joint constituting the planar exterior pipe rack system. In the planar exterior pipe rack system, the outer surface of a rack pipe may be formed as a planar surface in a simple manner, foreign matter may be blocked, and the strength of the rack pipe may be relatively increased due to the exterior thereof, as compared to a related-art rack pipe having a curved outer shape.

Technical Solution

According to an aspect of the present disclosure, provided is a planar exterior pipe rack system used to provide an industrial structure in a prefabrication manner.

The planar exterior pipe rack system may include: a rack pipe connecting rectangular joint; and a planar exterior forming rectangular rack pipe including a rack pipe body including a skeleton of the industrial structure and having non-planar outer surfaces, a joint coupling protrusion protruding outward from the rack pipe body to be coupled to the rack pipe connecting rectangular joint, and a plane forming portion extending from the joint coupling protrusion such that at least one portion of the rack pipe body has a planar outer surface.

The rack pipe connecting rectangular joint and a plurality of the planar exterior forming rectangular rack pipes may be connected to provide the industrial structure, with the rack pipe connecting rectangular joint and the planar exterior forming rectangular rack pipe being connected to each other while forming a planar surface.

According to an aspect of the present disclosure, provided is a planar exterior forming rectangular rack pipe constituting a planar exterior pipe rack system used to provide an industrial structure in a prefabricated manner and couplable to a rack pipe connecting rectangular joint to provide the industrial structure.

The planar exterior forming rectangular rack pipe may include: a rack pipe body including a skeleton of the industrial structure and having non-planar outer surfaces; a joint coupling protrusion protruding outward from the rack pipe body to be coupled to the rack pipe connecting rectangular joint; and a plane forming portion extending from the joint coupling protrusion such that at least one portion of the rack pipe body has a planar outer surface.

When the rack pipe connecting rectangular joint is inserted into at least one of the joint coupling protrusion and the rack pipe body, the rack pipe connecting rectangular joint and the plane forming portion are connected to each other while forming a planar surface.

According to an aspect of the present disclosure, provided is a rack pipe connecting rectangular joint constituting a planar exterior pipe rack system used to provide an industrial structure in a prefabricated manner and couplable to a planar exterior forming rectangular rack pipe to provide the industrial structure.

The rack pipe connecting rectangular joint may include: a rack pipe connecting joint member including a joint member body, a clamping portion provided on the joint member body and able to clamp a portion of the planar exterior forming rectangular rack pipe, a pipe insertion extension extending from a surface of the joint member body different from a surface on which the clamping portion is provided and able to be inserted into the planar exterior forming rectangular rack pipe, and a pipe insertion engaging portion extending from the pipe insertion extension and able to be inserted into the planar exterior forming rectangular rack pipe.

The rack pipe connecting joint member includes a pair of rack pipe connecting joint members.

The pair of rack pipe connecting joint members may be inserted into the planar exterior forming rectangular rack pipe while occupying an interior of the planar exterior forming rectangular rack pipe, with the pair of joint member bodies being engaged with each other, the pair of pipe insertion extensions being engaged with each other, and the pair of pipe insertion engaging portion being engaged with each other.

The pair of clamping portions may clamp the planar exterior forming rectangular rack pipe in a facing direction, such that the pair of rack pipe connecting joint members and a plane forming portion are connected while forming planar surfaces.

Advantageous Effects

According to an aspect of the present disclosure, in the planar exterior pipe rack system as well as the planar exterior forming rectangular rack pipe and the rack pipe connecting rectangular joint constituting the planar exterior pipe rack system, the pair of clamping portions of the rack pipe connecting rectangular joint clamp the joint coupling protrusions or the assembly of the pair of pipe insertion extensions and the assembly of the pair of pipe insertion engaging portions of the rack pipe connecting rectangular joint are inserted into the inner space of the rack pipe body, such that the rack pipe connecting rectangular joint is coupled to at least one of the joint coupling protrusions and the rack pipe body, so that the rack pipe connecting rectangular joint and the plane forming portion may be connected while forming planar surfaces. Thus, the outer surfaces of the planar exterior forming rectangular rack pipe may be formed as planar surfaces in a simple manner without any operation of, for example, attaching a separate member. Consequently, an operation of, for example, fitting a planar panel, mounting an absorber or a name plate, or fastening an angle to the outer surface of the curved rack pipe may be performed in a simple manner. In addition, assembling and mounting operations for coupling an annexed member may be performed perfectly, and foreign matter, such as dust, may be blocked. In addition, the strength of the planar exterior forming rectangular rack pipe may be relatively increased due to the exterior thereof, as compared to related-art rack pipes having a curved outer shape. Furthermore, the planar exterior forming rectangular rack pipe may be used as a column to support heavy-weight materials or bear a large load, thereby providing reliable support.

BEST MODE

Hereinafter, a planar exterior pipe rack system and a planar exterior forming rectangular rack pipe and a rack pipe connecting rectangular joint constituting the planar exterior pipe rack system according to embodiments of the present disclosure will be described with reference to the accompanying drawings.

Figure 1:
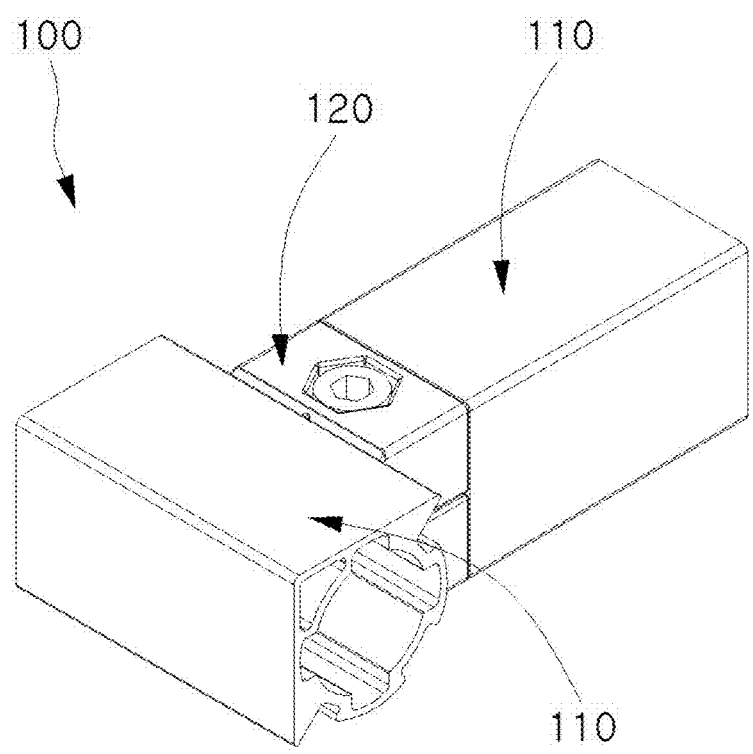
FIG. 1 is a perspective view illustrating a portion of a planar exterior pipe rack system according to a first embodiment of the present disclosure.
Figure 2:
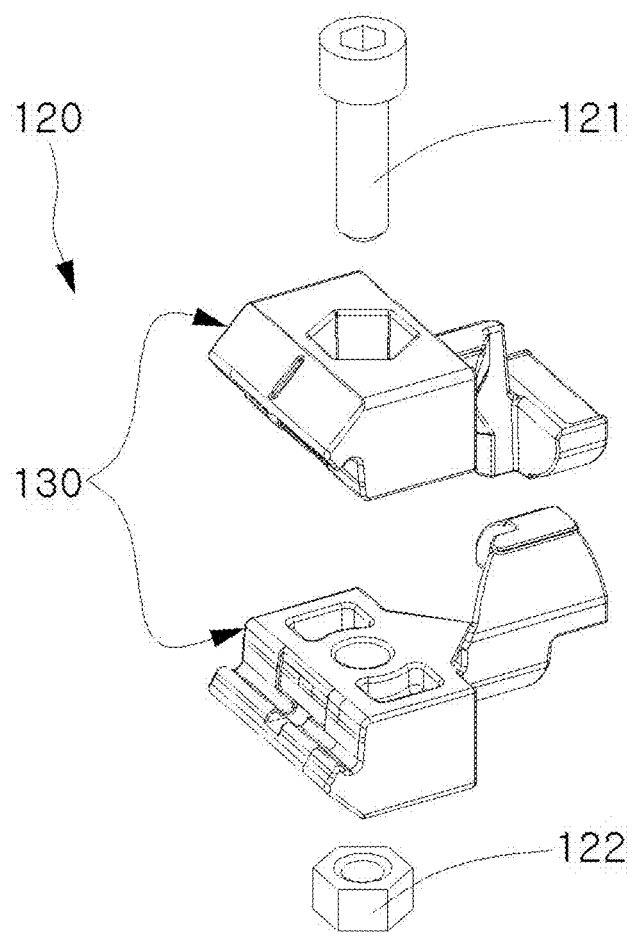
FIG. 2 is an exploded perspective view illustrating the rack pipe connecting rectangular joint of the planar exterior pipe rack system according to the first embodiment of the present disclosure.
Figure 3:
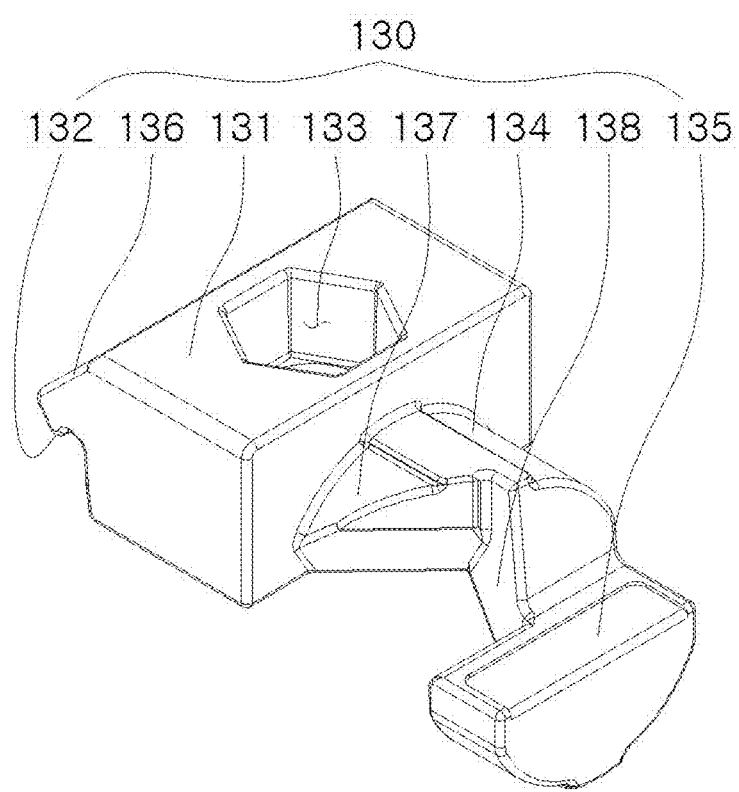
FIG. 3 is a perspective view illustrating the rack pipe connecting joint member of the planar exterior pipe rack system according to the first embodiment of the present disclosure.
Figure 4:
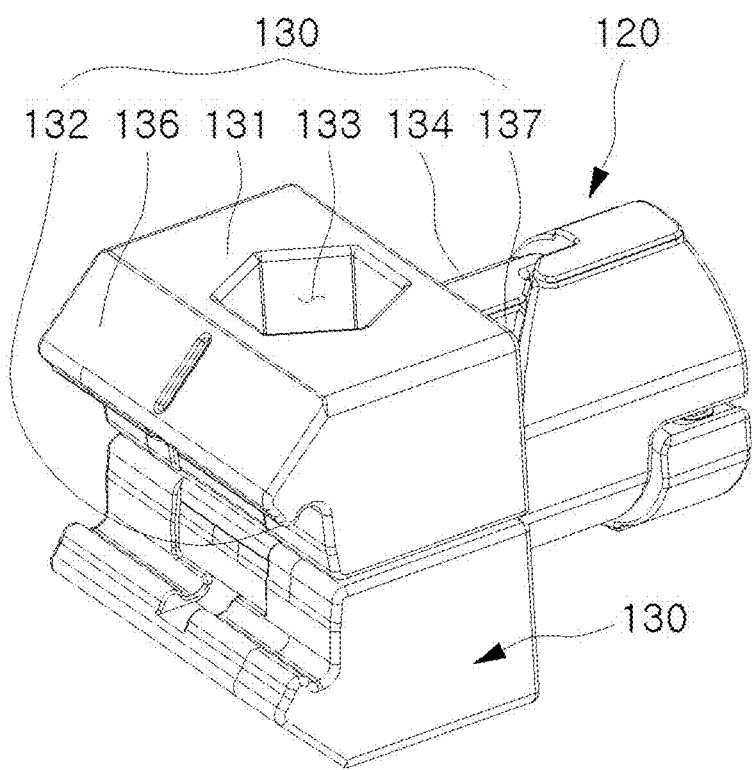
FIG. 4 is a perspective view illustrating the rack pipe connecting rectangular joint of the planar exterior pipe rack system according to the first embodiment of the present disclosure.
Figure 5:
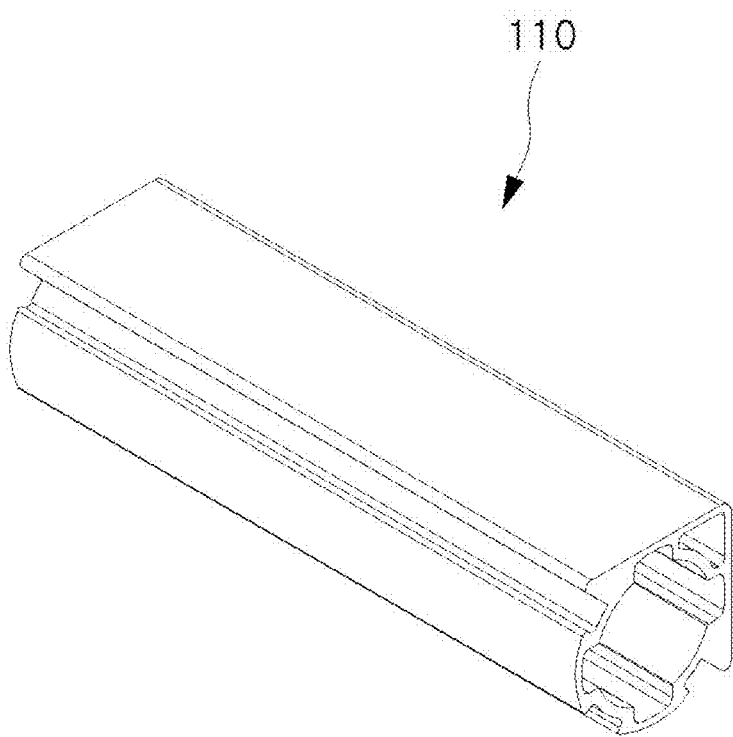
FIG. 5 is a perspective view illustrating the planar exterior forming rectangular rack pipe of the planar exterior pipe rack system according to the first embodiment of the present disclosure.
Figure 6:
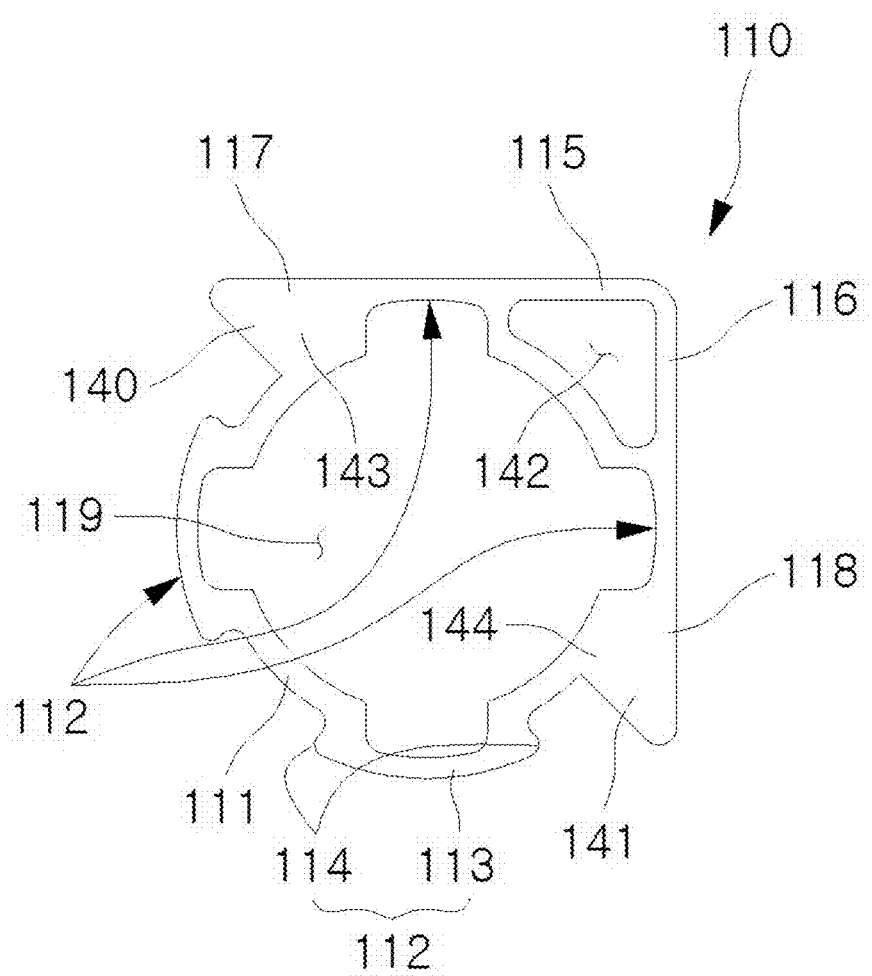
FIG. 6 is a front view illustrating the planar exterior forming rectangular rack pipe of the planar exterior pipe rack system according to the first embodiment of the present disclosure.
Figure 7:
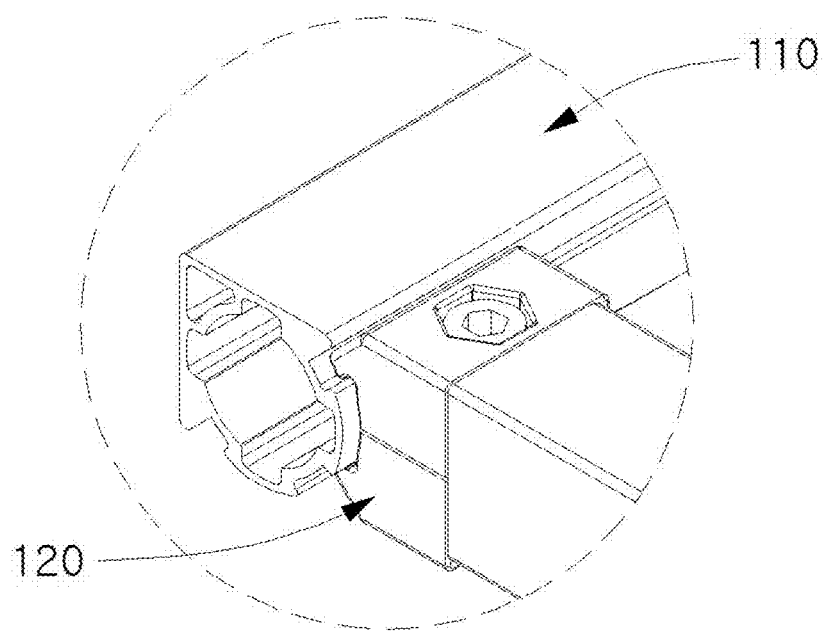
FIG. 7 is an enlarged view illustrating a coupled state of the planar exterior forming rectangular rack pipe and the rack pipe connecting rectangular joint of the planar exterior pipe rack system according to the first embodiment of the present disclosure.
Figure 8:
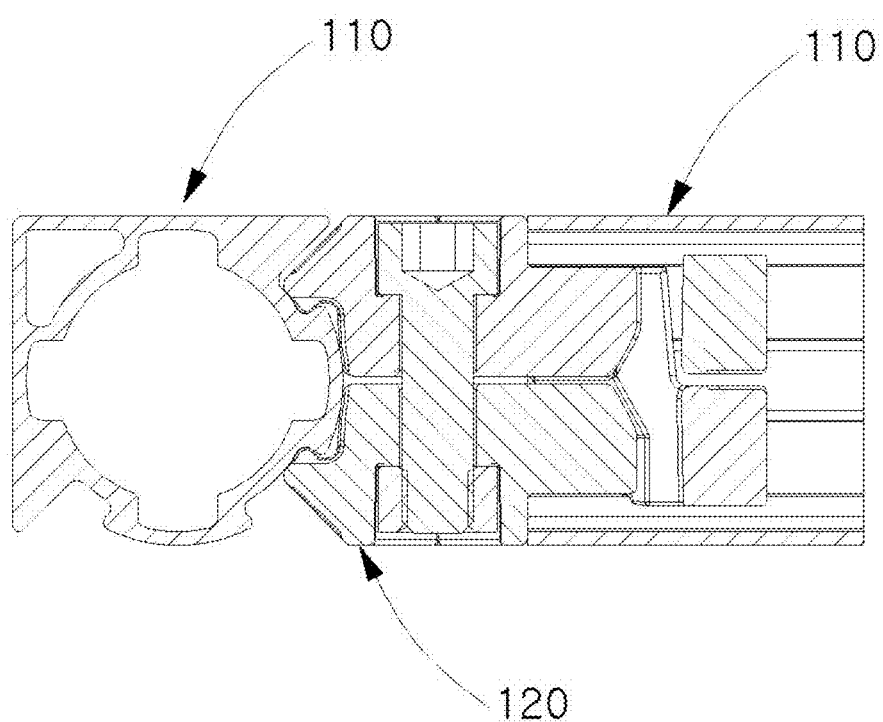
FIG. 8 is an enlarged cross-sectional view illustrating the coupled state of the planar exterior forming rectangular rack pipe and the rack pipe connecting rectangular joint of the planar exterior pipe rack system according to the first embodiment of the present disclosure.
Figure 9:
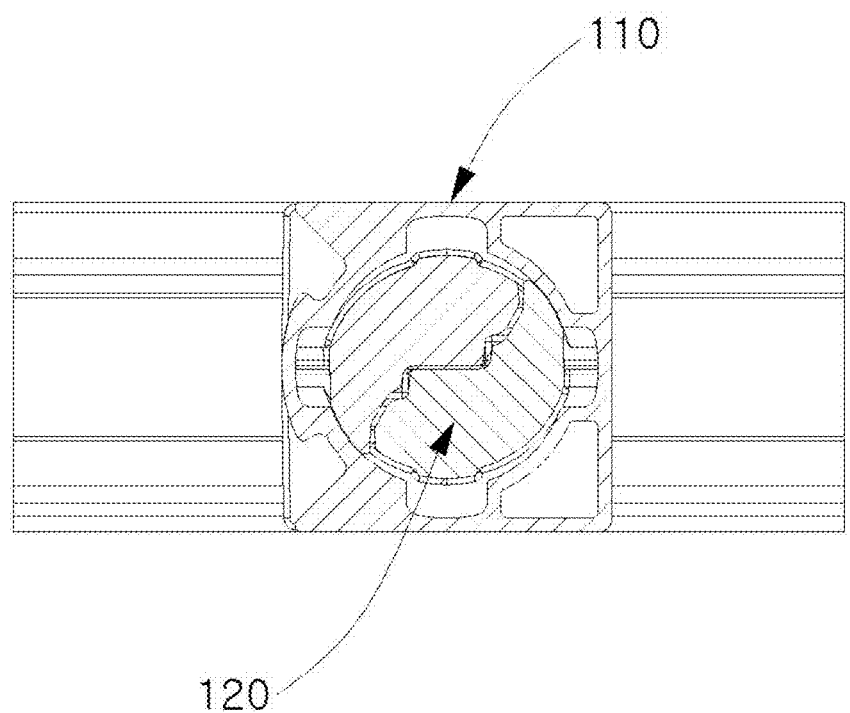
FIG. 9 is an enlarged cross-sectional view illustrating the coupled state of the planar exterior forming rectangular rack pipe and the rack pipe connecting rectangular joint of the planar exterior pipe rack system according to the first embodiment of the present disclosure, viewed from a different angle.

FIG. 1 is a perspective view illustrating a portion of a planar exterior pipe rack system according to a first embodiment of the present disclosure; FIG. 2 is an exploded perspective view illustrating the rack pipe connecting rectangular joint of the planar exterior pipe rack system according to the first embodiment of the present disclosure; FIG. 3 is a perspective view illustrating the rack pipe connecting joint member of the planar exterior pipe rack system according to the first embodiment of the present disclosure; FIG. 4 is a perspective view illustrating the rack pipe connecting rectangular joint of the planar exterior pipe rack system according to the first embodiment of the present disclosure; FIG. 5 is a perspective view illustrating the planar exterior forming rectangular rack pipe of the planar exterior pipe rack system according to the first embodiment of the present disclosure; FIG. 6 is a front view illustrating the planar exterior forming rectangular rack pipe of the planar exterior pipe rack system according to the first embodiment of the present disclosure; FIG. 7 is an enlarged view illustrating a coupled state of the planar exterior forming rectangular rack pipe and the rack pipe connecting rectangular joint of the planar exterior pipe rack system according to the first embodiment of the present disclosure; FIG. 8 is an enlarged cross-sectional view illustrating the coupled state of the planar exterior forming rectangular rack pipe and the rack pipe connecting rectangular joint of the planar exterior pipe rack system according to the first embodiment of the present disclosure; and FIG. 9 is an enlarged cross-sectional view illustrating the coupled state of the planar exterior forming rectangular rack pipe and the rack pipe connecting rectangular joint of the planar exterior pipe rack system according to the first embodiment of the present disclosure, viewed from a different angle.

Referring to FIGS. 1 to 9 together, a planar exterior pipe rack system 100 according to the present embodiment may be used to form an industrial structure in a prefabricated manner and include a rack pipe connecting rectangular joint 120 and planar exterior forming rectangular rack pipes 110.

The rack pipe connecting rectangular joint 120 and the planar exterior forming rectangular rack pipes 110 may be made of a variety of materials, such as an aluminum alloy.

The planar exterior forming rectangular rack pipes 110 according to the present embodiment serve as components of the planar exterior pipe rack system 100, and respectively includes a rack pipe body 111, joint coupling protrusions 112, and a plane forming portion 115, 116, 117, and 118 that may be coupled to the rack pipe connecting rectangular joint 120 to provide the industrial structure.

The planar exterior forming rectangular rack pipes 110 are extruded lengthwise so as to have the same cross-section and then are cut to required lengths for use.

The rack pipe connecting rectangular joint 120 according to the present embodiment serves as a component of the planar exterior pipe rack system 100, and includes rack pipe connecting joint members 130 that may be coupled to the planar exterior forming rectangular rack pipes 110 to form the industrial structure.

One or more rack pipe connecting rectangular joints 120 are inserted into and coupled to one or both distal ends of the planar exterior forming rectangular rack pipes 110, and other planar exterior forming rectangular rack pipes 110 are engaged with the rack pipe connecting rectangular joints 120 coupled to the planar exterior forming rectangular rack pipes 110. According to this structure, the planar exterior pipe rack system 100 may provide a variety of industrial structures, such as an industrial rack or an industrial hanger.

The rack pipe body 111 serves to form the skeleton of the industrial structure, and has the shape of a cylinder having a non-planar outer surface, i.e. a curved outer surface, with the entirety of the interior 119 thereof being hollow.

The joint coupling protrusions 112 may protrude out from the rack pipe body 111 to be coupled to the rack pipe connecting rectangular joint 120.

Specifically, each of the joint coupling protrusions 112 includes a joint coupling protrusion body 113 protruding outward a predetermined height from the rack pipe body 111 and joint coupling protrusion catches 114 protruding sideways predetermined lengths from both side edges of the top portion of the coupling protrusion body 113. Each of the joint coupling protrusions 112 may have an overall T-shaped cross-section. Thus, the joint coupling protrusions 112 may be firmly coupled to the rack pipe connecting rectangular joint 120 so as not to be accidently detached therefrom.

The plurality of joint coupling protrusions 112 are provided on the rack pipe body 111 such that the joint coupling protrusions 112 are spaced apart from each other. Particularly, the joint coupling protrusions 112 are configured such that the vertical centerlines thereof form the same included angles therebetween. For example, four joint coupling protrusions 112 are provided. The vertical centerlines of the joint coupling protrusions 112 may be perpendicular to each other.

The plane forming portion 115, 116, 117, and 118 extends from the joint coupling protrusions 112 such that at least a portion of the rack pipe body 111 has a planar outer surface.

Specifically, in the plane forming portion 115, 116, 117, and 118, a first plane forming portion 115 extends from the top portion of one of an adjacent pair of joint coupling protrusions 112 among the plurality of joint coupling protrusions 112 in the form of a planar surface, a the second plane forming portion 116 extends from the top portion of the other of the adjacent pair of joint coupling protrusions 112 among the plurality of joint coupling protrusions 112 in the form of a planar surface. The first plane forming portion 115 and the second plane forming portion 116 cover a portion of an area above the rack pipe body 111 while perpendicularly joining each other, such that the corresponding portion of the rack pipe body 111 is covered with two outer surfaces in the form of planar surfaces.

The outer surfaces of the first plane forming portion 115 and the second plane forming portion 116 are coplanar with the outer surfaces of the joint coupling protrusions 112. The first plane forming portion 115 and the second plane forming portion 116 cover a portion of the area above the rack pipe body 111 while perpendicularly joining each other. Thus, the joint coupling protrusions 112, together with the first plane forming portion 115 and the second plane forming portion 116, form two perpendicularly-connected surfaces, such that planar surfaces are formed on some of the outer surfaces of the rack pipe body 111.

A space 142 between the joint coupling protrusions 112, the first plane forming portion 115, and the second plane forming portion 116 may be formed as a hollow space for the purpose of weight reduction.

In the present embodiment, a first planar opposite extension 117 and a second planar opposite extension 118 extend from the joint coupling protrusions 112 in the form of planar surfaces, in directions opposite to the directions in which the first plane forming portion 115 and the second plane forming portion 116 extend.

The first planar opposite extension 117 and the first plane forming portion 115 are coplanar with the outer surfaces of the joint coupling protrusions 112, from which the first planar opposite extension 117 and the first plane forming portion 115 extend, thereby entirely covering the rack pipe body 111. In addition, the second planar opposite extension 118 and the second plane forming portion 116 are coplanar with the outer surfaces of the joint coupling protrusions 112, from which the second planar opposite extension 118 and the second plane forming portion 116 extend, thereby entirely covering the rack pipe body 111.

A first body-directed extension 140 and a second body-directed extension 141 extend in the form of planar surfaces from distal ends of the first planar opposite extension 117 and the second planar opposite extension 118 in directions toward the center of the rack pipe body 111, thereby joining the outer surfaces of the rack pipe body 111, respectively. Then, the first body-directed extension 140 and the second body-directed extension 141 contact the inclined outer surfaces of clamping portions 132 of the rack pipe connecting rectangular joint 120 to be described below, such that the rack pipe connecting rectangular joint 120 and the planar exterior forming rectangular rack pipes 110 may be in close contact with and firmly coupled to each other so as not to be moved by external force.

A portion 143 between the first planar opposite extension 117, the first body-directed extension 140, and the outer surface of the rack pipe body 111 and a portion 144 between the second planar opposite extension 118, the second body-directed extension 141, and the outer surface of the rack pipe body 111 are respectively occupied by the same metal as the rack pipe body 111.

In addition, each of the rack pipe connecting joint members 130 includes a joint member body 131, the clamping portion 132, a pipe insertion extension 134, and a pipe insertion engaging portion 135.

The joint member body 131 has an overall outer shape of a rectangular parallelepiped, such that, when the joint member body 131 is coupled to the planar exterior forming rectangular rack pipe 110, a surface state without a stepped portion is formed between the joint member body 131 and the planar exterior forming rectangular rack pipe 110. Consequently, the four surfaces of the joint member body 131 and the planar exterior forming rectangular rack pipe 110 are perpendicularly connected while forming planar surfaces.

The joint member body 131 has a fastener through-hole 133 into which a separate fastener (or fastening means) 121, such as a bolt, may be fitted. A separate holder (or holding means) 122, such as a nut, is fastened to the lower portion of the separate fastener 121 that has passed through the fastener through-hole 133.

The clamping portion 132 is provided on the front portions of the joint member body 131, such that the clamping portions 132 may clamp a portion of the planar exterior forming rectangular rack pipe 110.

The inclined outer surface 136 is provided on the outer portion of the clamping portion 132, i.e. herein the top surface of the clamping portion 132. The inclined outer surface 136 is inclined such that the inclined outer surface 136 extends downward in the forward direction.

The pipe insertion extension 134 may extend rearward from a surface of the joint member body 131, i.e. herein a rear surface portion of the joint member body 131, different from the surface on which the clamping portion 132 is formed, so as to be inserted into the planar exterior forming rectangular rack pipe 110.

The pipe insertion engaging portion 135 may extend rearward from the pipe insertion extension 134 to be inserted into the planar exterior forming rectangular rack pipe 110.

The pipe insertion extension 134 has a semicylindrical structure occupying one side with respect to a virtual centerline vertically extending through the center of the joint member body 131. The pipe insertion engaging portion 135 has a semicylindrical structure extending from the distal end of the pipe insertion extension 134 and occupying one side with respect to a virtual centerline transversely extending through the center of the pipe insertion extension 134, such that the pipe insertion engaging portion 135 is perpendicular to the pipe insertion extension 134.

In the present embodiment, a pipe insertion reinforcing inclined portion 137 extends from the joint member body 131 in the other side different from one side occupied by the pipe insertion extension 134 with respect to the virtual centerline vertically extending through the center of the joint member body 131 and is integrally connected to the pipe insertion extension 134.

The pipe insertion reinforcing inclined portion 137 extends rearward from the joint member body 131, i.e. in the direction of the pipe insertion engaging portion 135. The pipe insertion reinforcing inclined portion 137 has a curved outer surface connected to the pipe insertion extension 134 and being inclined to gradually converge to the pipe insertion extension 134 in the rearward direction. Then, a connecting portion between the pipe insertion extension 134 and the joint member body 131 extends a length equal to that of a connecting portion of the pipe insertion reinforcing inclined portion 137, such that accidental separation, such as fracture, due to the concentration of stress between the joint member body 131 and the pipe insertion extension 134, may be prevented.

The pipe insertion reinforcing inclined portion 137 may be formed or molded integrally with the joint member body 131, the pipe insertion extension 134, and the pipe insertion engaging portion 135, may be formed or molded separately from the joint member body 131, the pipe insertion extension 134, and the pipe insertion engaging portion 135 before being integrated with the joint member body 131 and the pipe insertion extension 134.

A pipe insertion connecting portion 138 is formed between the pipe insertion extension 134 and the pipe insertion engaging portion 135.

The pipe insertion connecting portion 138 is connected to the pipe insertion engaging portion 135 while occupying one side with respect to a virtual centerline vertically extending through the center of the joint member body 131.

The rack pipe connecting joint members 130 are provided as a pair of rack pipe connecting joint members. Then, the joint member bodies 131, the pipe insertion extensions 134, and the pipe insertion engaging portions 135 in the pair of rack pipe connecting joint members are engaged with each other, such that an assembly of the pair of joint member bodies 131 is connected to the planar exterior forming rectangular rack pipe 110 generally without a stepped portion, and an assembly of the pair of pipe insertion extensions 134 and an assembly of the pair of pipe insertion engaging portions 135 have a generally cylindrical shape and are inserted into an inner space 119 of the rack pipe body 111. Consequently, the pair of rack pipe connecting joint members 130 may be inserted into the planar exterior forming rectangular rack pipe 110 while occupying the inner space of the planar exterior forming rectangular rack pipe 110, and the pair of clamping portions 132 may clamp the planar exterior forming rectangular rack pipe 110 in a facing direction.

As described above, only when the pipe insertion engaging portions 135 are inserted into the inner space 119 of the rack pipe body 111, the planar exterior forming rectangular rack pipe 110 and the rack pipe connecting rectangular joint 120 may be coupled in a simple manner without an additional member. Thus, the planar exterior forming rectangular rack pipe 110 and the rack pipe connecting rectangular joint 120 may be coupled rapidly, accurately, and simply.

When the rack pipe connecting joint members 130 are butted against each other, the joint member bodies 131 are butted against each other, the pipe insertion extensions 134 are butted against each other, the pipe insertion engaging portions 135 are butted against each other, the pipe insertion reinforcing inclined portions 137 are butted against each other, and the pipe insertion connecting portions 138 are butted against each other, so that the rack pipe connecting joint members 130 may be easily inserted into the planar exterior forming rectangular rack pipe 110.

As described above, the assembly of the pair of clamping portions 132 of the rack pipe connecting rectangular joint 120 clamps the joint coupling protrusions 112, or the assembly of the pair of pipe insertion extensions 134 and the assembly of the pair of pipe insertion engaging portions 135 of the rack pipe connecting rectangular joint 120 are inserted into the inner space 119 of the rack pipe body 111, so that the rack pipe connecting rectangular joint 120 is directly coupled to at least one of the joint coupling protrusions 112 and the rack pipe body 111. Consequently, the rack pipe connecting rectangular joint 120 and the plane forming portion 115, 116, 117, and 118 may be connected while forming planar surfaces.

As described above, only when the rack pipe connecting rectangular joint 120 comprised of the pair of rack pipe connecting joint members 130 is inserted into the planar exterior forming rectangular rack pipe 110, the rack pipe connecting rectangular joint 120 and the planar exterior forming rectangular rack pipe 110 may be connected in a simple manner. Thus, an additional fastener (or fastening means), such as a bolt, a nut, or an L-shaped bracket, which has been used in the related art to connect the rack pipe connecting rectangular joint 120 and the planar exterior forming rectangular rack pipe 110, is unnecessary. Accordingly, the coupling between the rack pipe connecting rectangular joint 120 and the planar exterior forming rectangular rack pipe 110 may be performed simply and tidily.

According to the present embodiment, the planar exterior pipe rack system 100 may enable a plurality of rack pipe connecting rectangular joint 120 and a plurality of planar exterior forming rectangular rack pipes 110 to be connected, thereby forming an industrial structure.

As described above, the planar exterior forming rectangular rack pipe 110 includes the rack pipe body 111, the joint coupling protrusions 112, and the plane forming portion 115, 116, 117, and 118, such that the outer surfaces of the planar exterior forming rectangular rack pipe 110 may be formed as planar surfaces in a simple manner without an operation of, for example, attaching a separate member. Consequently, an operation of, for example, fitting a planar panel, mounting an absorber or a name plate, or fastening an angle to the outer surface of the curved rack pipe may be performed in a simple manner. In addition, assembling and mounting operations for coupling an annexed member may be performed perfectly, and foreign matter, such as dust, may be blocked. In addition, the strength of the planar exterior forming rectangular rack pipe may be relatively increased due to the exterior thereof, as compared to related-art rack pipes having a curved outer shape. Furthermore, the planar exterior forming rectangular rack pipe may be used as a column to support heavy-weight materials or bear a large load, thereby providing reliable support.

MODE FOR INVENTION

Hereinafter, a planar exterior pipe rack system and a planar exterior forming rectangular rack pipe and a rack pipe connecting rectangular joint constituting the planar exterior pipe rack system according to other embodiments of the present disclosure will be described with reference to the accompanying drawings. In the following descriptions of the other embodiments, descriptions of some features will be omitted when they are identical to those of the above-described first embodiment of the present disclosure.

Figure 10:
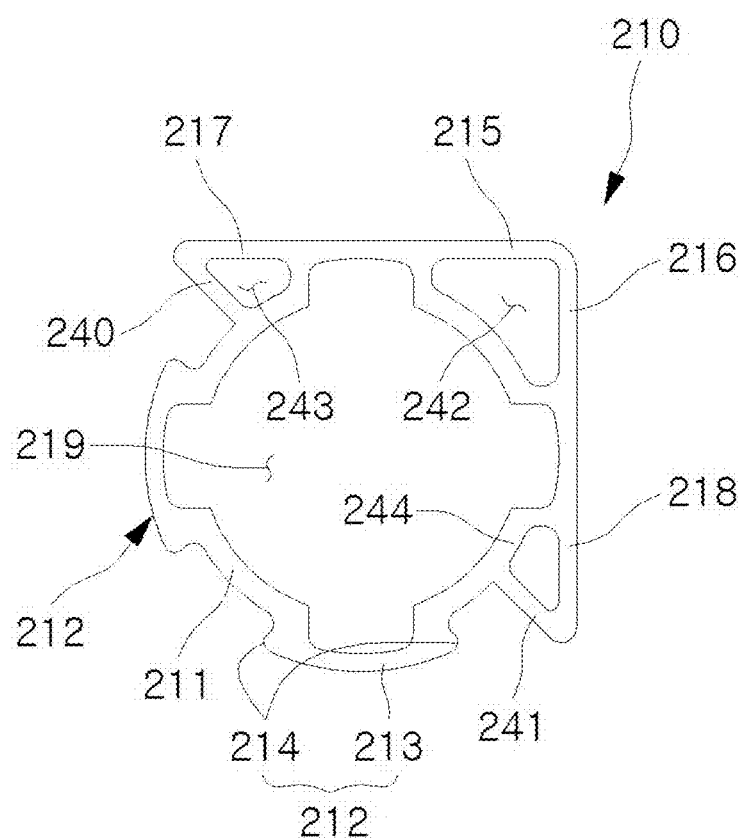
FIG. 10 is a front view illustrating a planar exterior forming rectangular rack pipe of a planar exterior pipe rack system according to a second embodiment of the present disclosure.

FIG. 10 is a front view illustrating a planar exterior forming rectangular rack pipe of a planar exterior pipe rack system according to a second embodiment of the present disclosure.

Referring to FIG. 10, a planar exterior forming rectangular rack pipe 210 according to the present embodiment is substantially the same as the planar exterior forming rectangular rack pipe 110 according to the above-described first embodiment, except for portions to be described below.

In the present embodiment, a portion 243 between a first planar opposite extension 217, a first body-directed extension 240, the outer surface of a rack pipe body 211 and a portion 244 between a second planar opposite extension 218, a second body-directed extension 241, and the outer surface of the rack pipe body 211 are formed as hollow spaces, respectively, for the purpose of weight reduction.

Figure 11:
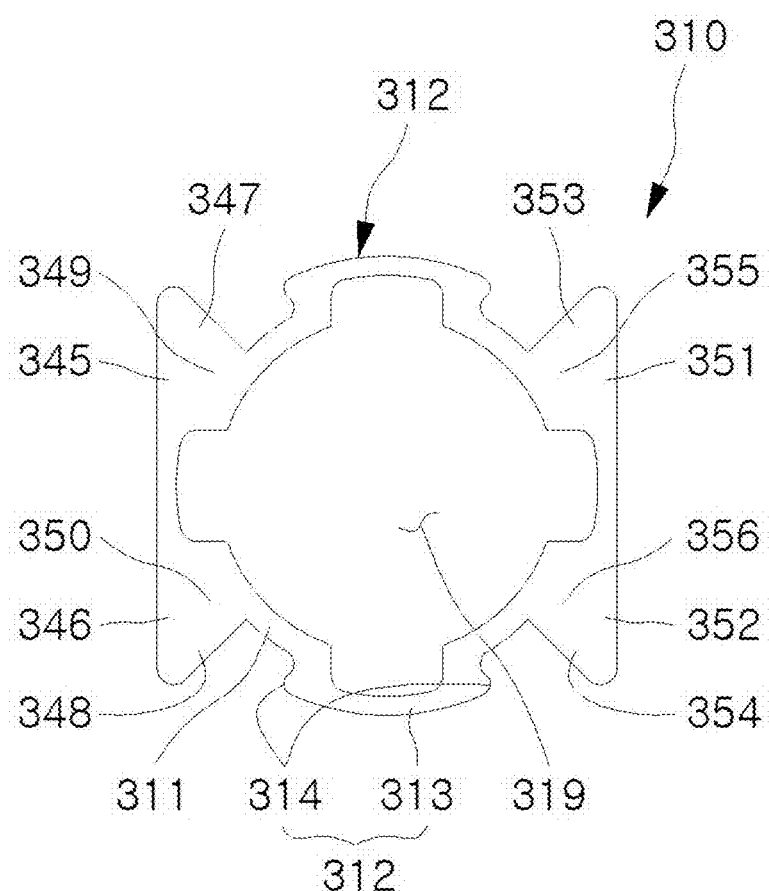
FIG. 11 is a front view illustrating a planar exterior forming rectangular rack pipe of a planar exterior pipe rack system according to a third embodiment of the present disclosure.

FIG. 11 is a front view illustrating a planar exterior forming rectangular rack pipe of a planar exterior pipe rack system according to a third embodiment of the present disclosure.

Referring to FIG. 11, in the present embodiment, a plane forming portion 351 and a first planar opposite extension 352 extend from one of a plurality of joint coupling protrusions 312 in opposite directions to form planar surfaces connected to each other. A first body-directed extension 353 and a second body-directed extension 354 extend from distal ends of the plane forming portion 351 and the first planar opposite extension 352 toward the center of a rack pipe body 311, respectively. Distal ends of the first body-directed extension 353 and the second body-directed extension 354 join the outer surface of the rack pipe body 311. A portion 355 between the first plane forming portion 351, the first body-directed extension 353, and the outer surface of the rack pipe body 311 and a portion 356 between the first planar opposite extension 352, the second body-directed extension 354, and the outer surface of the rack pipe body 311 are respectively occupied by the same metal as the rack pipe body 311.

In addition, in the present embodiment, when a virtual centerline extending through the center of the rack pipe body 311 is drawn to be parallel to the outer surfaces of the first plane forming portion 351 and the first planar opposite extension 352, the planar exterior forming rectangular rack pipe 310 is linearly symmetrical about the virtual centerline.

That is, a second plane forming portion 345, a second planar opposite extension 346, a third body-directed extension 347, and a fourth body-directed extension 348 are formed on other portions of the rack pipe body 311 so as to be symmetrical to the first plane forming portion 351, the first planar opposite extension 352, the first body-directed extension 353, and the second body-directed extension 354 with respect to the vertical centerline. A portion 349 between the second plane forming portion 345, the third body-directed extension, 347 and the outer surface of the rack pipe body 311 and a portion 350 between the second planar opposite extension 346, the fourth body-directed extension 348, and the rack pipe body 311 are respectively occupied by the same metal as the rack pipe body 311.

Figure 12:
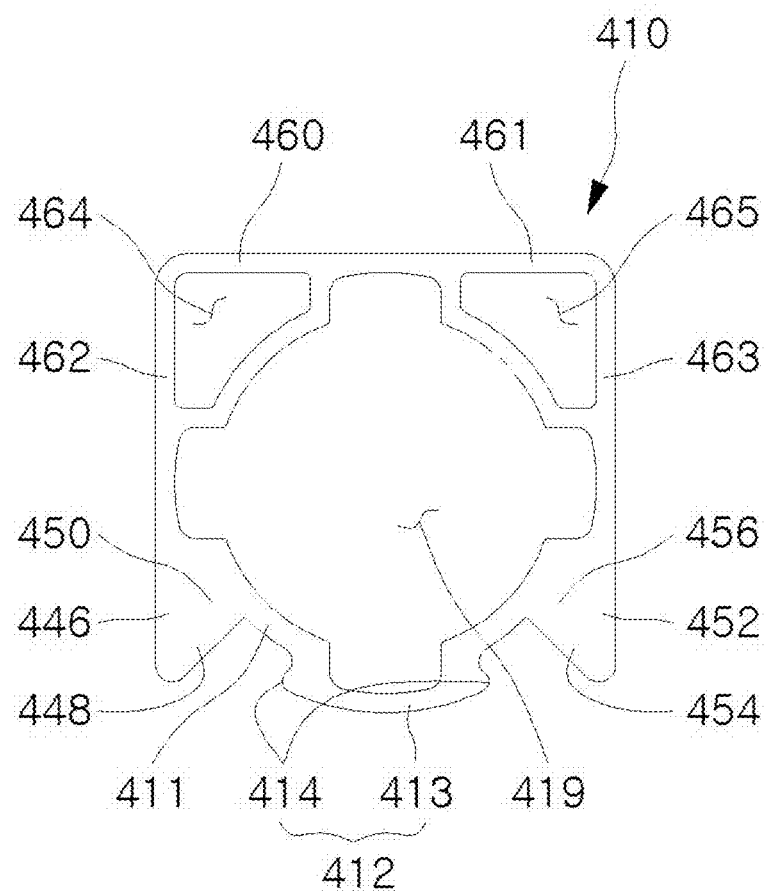
FIG. 12 is a front view illustrating a planar exterior forming rectangular rack pipe of a planar exterior pipe rack system according to a fourth embodiment of the present disclosure.

FIG. 12 is a front view illustrating a planar exterior forming rectangular rack pipe of a planar exterior pipe rack system according to a fourth embodiment of the present disclosure.

Referring to FIG. 12, a planar exterior forming rectangular rack pipe 410 according to the present embodiment is substantially the same as the above-described planar exterior forming rectangular rack pipe 110 according to the first embodiment, except for portions to be described below.

In the present embodiment, the first plane forming portion 461 and the second plane forming portion 463 join each other. A space 465 between the first plane forming portion 461, the second plane forming portion 463, and the outer surface of a rack pipe body 411 is formed as a hollow space. A second planar opposite extension 452 and a second body-directed extension 454 are provided. A portion 456 between the second planar opposite extension 452, the second body-directed extension 454, and the outer surface of the rack pipe body 411 is occupied by the same material as the rack pipe body 411.

In addition, in the present embodiment, when a virtual centerline extending through the center of the rack pipe body 411 is drawn to be parallel to the outer surfaces of the second plane forming portion 463 and the second planar opposite extension 452, the planar exterior forming rectangular rack pipe 410 is provided linearly symmetrical about the virtual centerline.

That is, a third plane forming portion 460, a fourth plane forming portion 462, a fourth planar opposite extension 446, and a fourth body-directed extension 448 are provided in other portions of the rack pipe body 411, respectively, so as to be symmetrical to the first plane forming portion 461, the second plane forming portion 463, the second planar opposite extension 452, and the second body-directed extension 454 about the virtual centerline, respectively. A space 464 between the third plane forming portion 460, the fourth plane forming portion 462, and the outer surface of the rack pipe body 411 is formed as a hollow space. A portion 450 between the fourth planar opposite extension 446, the fourth body-directed extension 448, and the outer surface of the rack pipe body 411 is occupied by the same metal as the rack pipe body 411.

Figure 13:
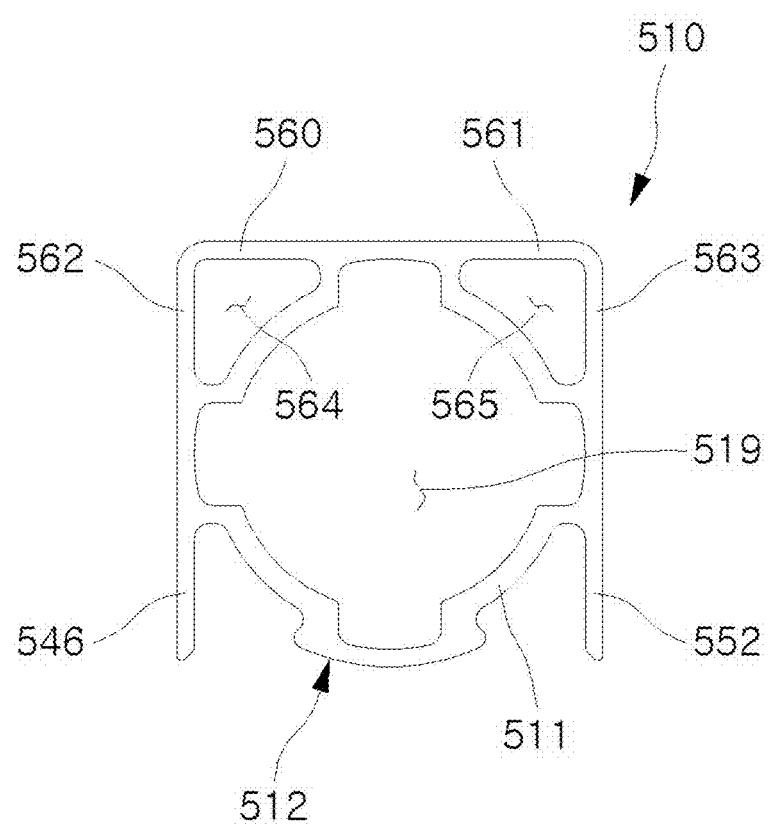
FIG. 13 is a front view illustrating a planar exterior forming rectangular rack pipe of a planar exterior pipe rack system according to a fifth embodiment of the present disclosure.

FIG. 13 is a front view illustrating a planar exterior forming rectangular rack pipe of a planar exterior pipe rack system according to a fifth embodiment of the present disclosure.

Referring to FIG. 13, a planar exterior forming rectangular rack pipe 510 according to the present embodiment is substantially the same as the planar exterior forming rectangular rack pipe 410 according to the fourth embodiment, except for portions to be described below.

In the present embodiment, a second planar opposite extension 552 and a fourth planar opposite extension 546 are provided, whereas the second body-directed extension and the fourth body-directed extension are removed. In addition, distal ends of the second planar opposite extension 552 and the fourth planar opposite extension 546 remain spaced apart from a rack pipe body 511.

Figure 14:
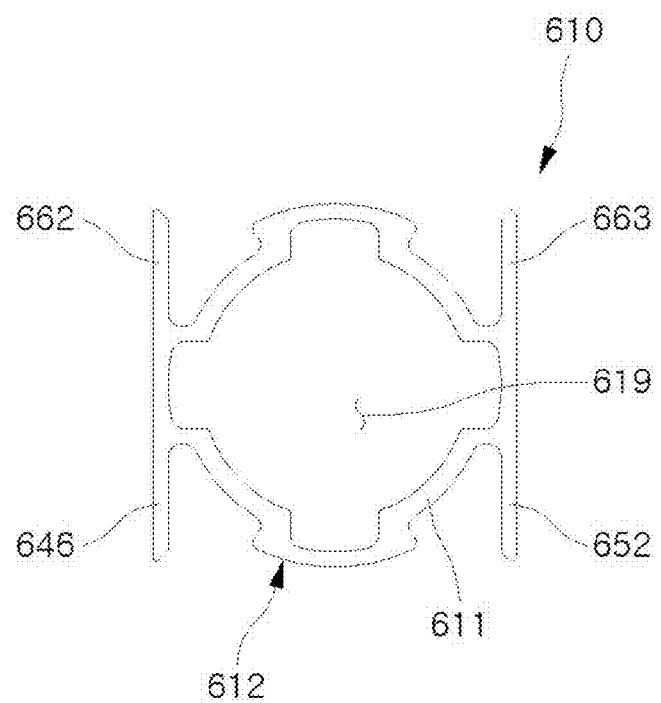
FIG. 14 is a front view illustrating a planar exterior forming rectangular rack pipe of a planar exterior pipe rack system according to a sixth embodiment of the present disclosure.

FIG. 14 is a front view illustrating a planar exterior forming rectangular rack pipe of a planar exterior pipe rack system according to a sixth embodiment of the present disclosure.

Referring to FIG. 14, a planar exterior forming rectangular rack pipe 610 according to the present embodiment is substantially the same as the planar exterior forming rectangular rack pipe 510 according to the fifth embodiment, except for portions to be described below.

In the present embodiment, a second plane forming portion 663 and a fourth plane forming portion 662 are provided, whereas the first plane forming portion and the third plane forming portion are removed. In addition, distal ends of the second plane forming portion 663 and the fourth plane forming portion 662 remain spaced apart from a rack pipe body 611.

Figure 15:
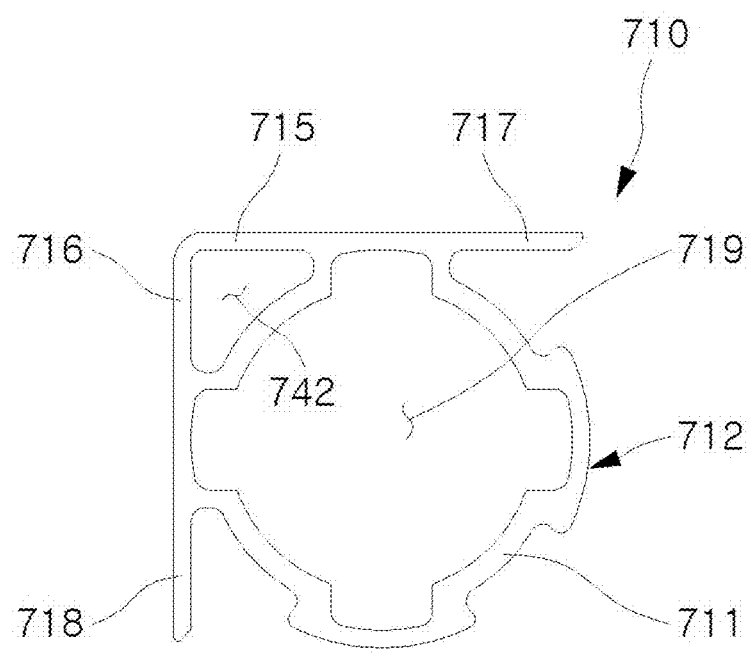
FIG. 15 is a front view illustrating a planar exterior forming rectangular rack pipe of a planar exterior pipe rack system according to a seventh embodiment of the present disclosure.

FIG. 15 is a front view illustrating a planar exterior forming rectangular rack pipe of a planar exterior pipe rack system according to a seventh embodiment of the present disclosure.

Referring to FIG. 15, a planar exterior forming rectangular rack pipe 710 according to the present embodiment is substantially the same as the planar exterior forming rectangular rack pipe 110 according to the first embodiment, except for portions to be described below.

In the present embodiment, a first planar opposite extension 717 and a second planar opposite extension 718 are provided, whereas the first body-directed extension and the second planar opposite extension are removed. In addition, distal ends of the first planar opposite extension 717 and the second planar opposite extension 718 remain spaced apart from a rack pipe body 711.

Figure 16:
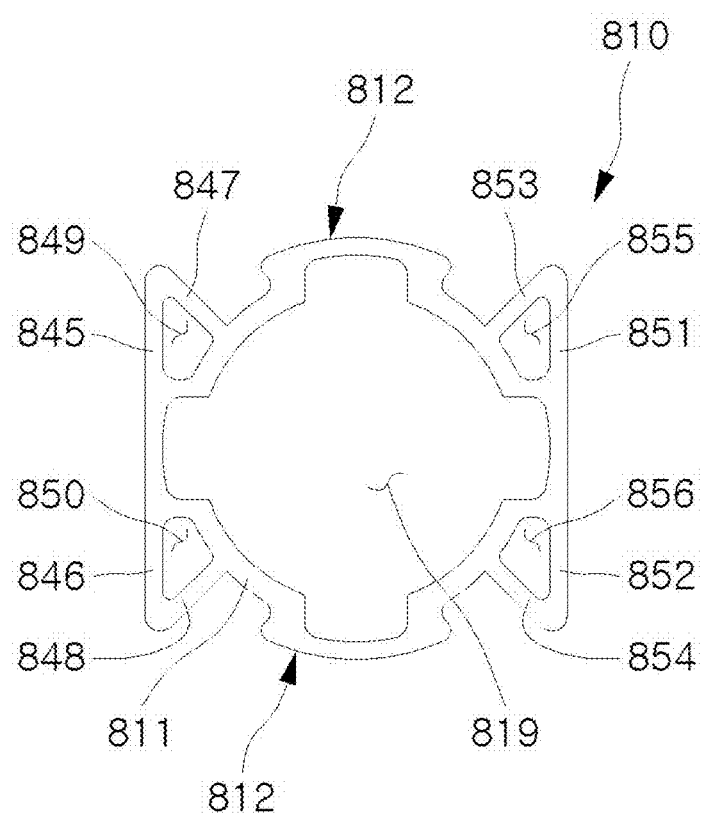
FIG. 16 is a front view illustrating a planar exterior forming rectangular rack pipe of a planar exterior pipe rack system according to an eighteenth embodiment of the present disclosure.

FIG. 16 is a front view illustrating a planar exterior forming rectangular rack pipe of a planar exterior pipe rack system according to an eighteenth embodiment of the present disclosure.

Referring to FIG. 16, according to the present embodiment, a planar exterior forming rectangular rack pipe 810 is substantially the same as the planar exterior forming rectangular rack pipe 310 according to the third embodiment, except for portions to be described below.

A space 855 between a first plane forming portion 851, a first body-directed extension 853, and the outer surface of a rack pipe body 811 and a space 856 between a first planar opposite extension 852, a second body-directed extension 854, and the outer surface of the rack pipe body 811 are formed as hollow spaces, respectively. A space 849 between a second plane forming portion 845, a third body-directed extension 847, and the outer surface of the rack pipe body 811 and a space 850 between a second planar opposite extension 846, a fourth body-directed extension 848, and the outer surface of the rack pipe body 811 are formed as hollow spaces.

Figure 17:
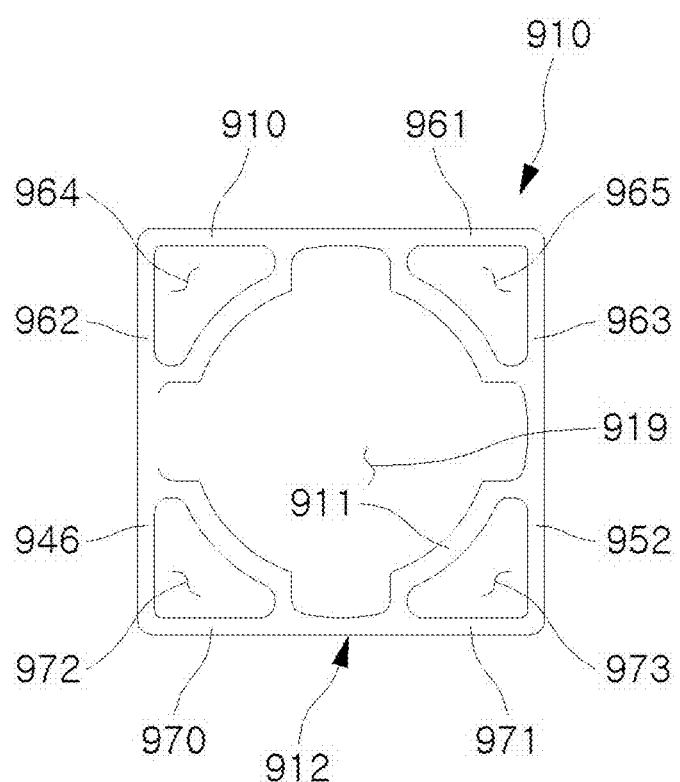
FIG. 17 is a front view illustrating a planar exterior forming rectangular rack pipe of a planar exterior pipe rack system according to a nineteenth embodiment of the present disclosure.

FIG. 17 is a front view illustrating a planar exterior forming rectangular rack pipe of a planar exterior pipe rack system according to a nineteenth embodiment of the present disclosure.

Referring to FIG. 17, a planar exterior forming rectangular rack pipe 910 according to the present embodiment is substantially the same as the planar exterior forming rectangular rack pipe 510 according to the fifth embodiment, except for portions to be described below.

In the present embodiment, in addition to a second planar opposite extension 952 and a fourth planar opposite extension 946, a planar opposite extension 971 and a sixth planar opposite extension 970 are further formed.

The fifth planar opposite extension 971 extends in the form of a planar surface from a joint coupling protrusion 912 adjacent to another joint coupling protrusion 912 from which the second planar opposite extension 952 extends so as to join the second planar opposite extension 952. A space 973 between the second planar opposite extension 952, the fifth planar opposite extension 971, and the outer surface of a rack pipe body 911 is formed as a hollow space.

The sixth planar opposite extension 970 extends in the form of a planar surface from the joint coupling protrusion 912 adjacent to another joint coupling protrusion 912 from which the fourth planar opposite extension 946 extends so as to join the fourth planar opposite extension 946. A space 972 between the fourth planar opposite extension 946, the sixth planar opposite extension 970, and the outer surface of the rack pipe body 911 is formed as a hollow space.

Figure 18:
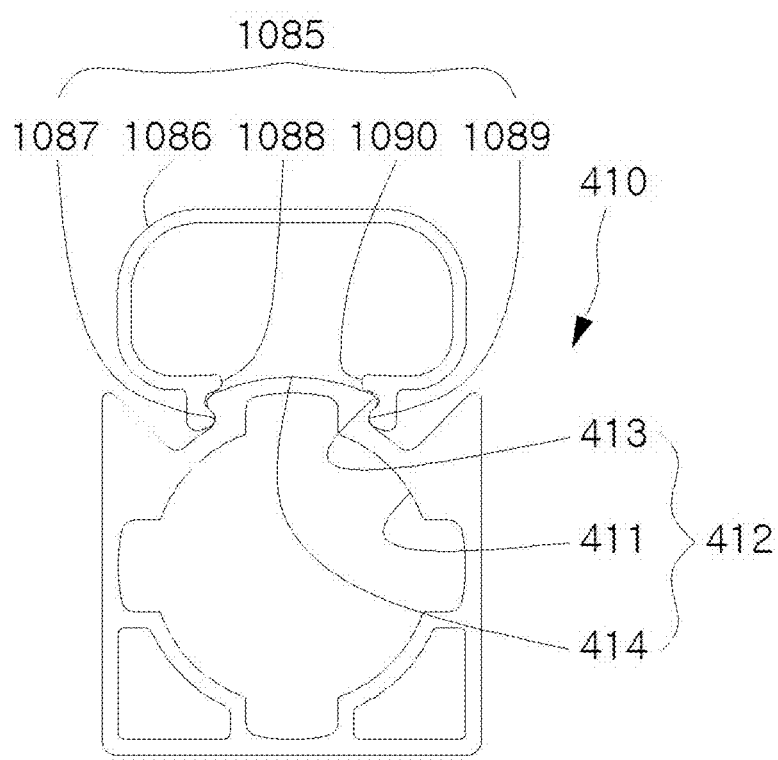
FIG. 18 illustrates an example in which a linear object cover of a planar exterior pipe rack system according to a tenth embodiment of the present disclosure is applied.
Figure 19:
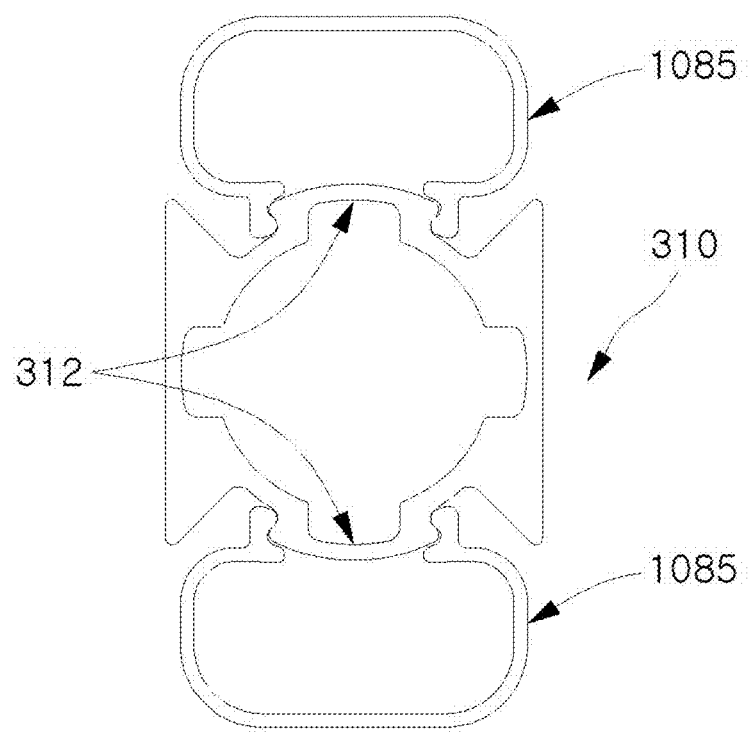
FIG. 19 illustrates another example in which the linear object covers of the planar exterior pipe rack system according to the tenth embodiment of the present disclosure are applied.
Figure 20:
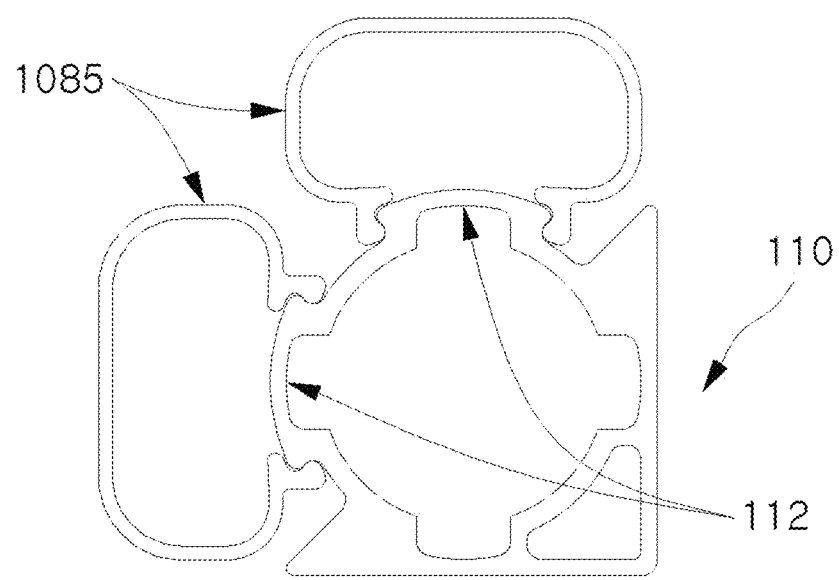
FIG. 20 illustrates a further example in which the linear object covers of the planar exterior pipe rack system according to the tenth embodiment of the present disclosure are applied.

FIG. 18 illustrates an example in which a linear object cover of a planar exterior pipe rack system according to a tenth embodiment of the present disclosure is applied, FIG. 19 illustrates another example in which the linear object covers of the planar exterior pipe rack system according to the tenth embodiment of the present disclosure are applied, and FIG. 20 illustrates another example in which the linear object covers of the planar exterior pipe rack system according to the tenth embodiment of the present disclosure are applied.

Referring to FIGS. 18 to 20, in the present embodiment, the planar exterior pipe rack system further includes linear object covers 1085.

In FIG. 18, the linear object cover 1085 is illustrated as being applied to the planar exterior forming rectangular rack pipe 410 according to the fourth embodiment of the present disclosure. In FIG. 19, the linear object covers 1085 are illustrated as being applied to the planar exterior forming rectangular rack pipe 310 according to the third embodiment of the present disclosure. In addition, in FIG. 20, the linear object covers 1085 are illustrated as being applied to the planar exterior forming rectangular rack pipe 110 according to the first embodiment of the present disclosure.

In addition to these illustrative examples, the linear object covers 1085 may be applied to a variety of other embodiments of the planar exterior forming rectangular rack pipe.

Hereinafter, it should be understood, for the sake of brevity, that an example in which the linear object cover 1085 is applied to the planar exterior forming rectangular rack pipe 410 according to the fourth embodiment of the present disclosure will be described in detail and that such description will be equally applied to the other embodiments.

The linear object cover 1085 may be detachably coupled to the joint coupling protrusion 412 so as to cover a linear object, such as a cable, arranged in the longitudinal direction of the planar exterior forming rectangular rack pipe 410.

The linear object cover 1085 includes a cover body 1086 having a shape, for example, a curved shape, with which the linear object may be covered, cover body edge outer portions 1087 and 1089 bent outward from both edges of the cover body 1086, and cover body protrusions 1088 and 1090 protruding outward from the both edges of the cover body 1086 so as to be spaced apart predetermined heights from the cover body edge outer portions 1087 and 1089.

When a joint coupling protrusion body 413 of the joint coupling protrusion 412 is fitted into a space between the cover body edge outer portions 1087 and 1089 and the cover body protrusions 1088 and 1090, the linear object cover 1085 is detachably coupled to the joint coupling protrusion 412.

Since the linear object cover 1085 is applied as described above, the linear object, such as a cable, arranged in the longitudinal direction of the planar exterior forming rectangular rack pipe 410 may be covered with the linear object cover 1085. Accordingly, a tidy appearance may be produced, and the linear object may be prevented from being accidently exposed, thereby preventing an accident.

Figure 21:
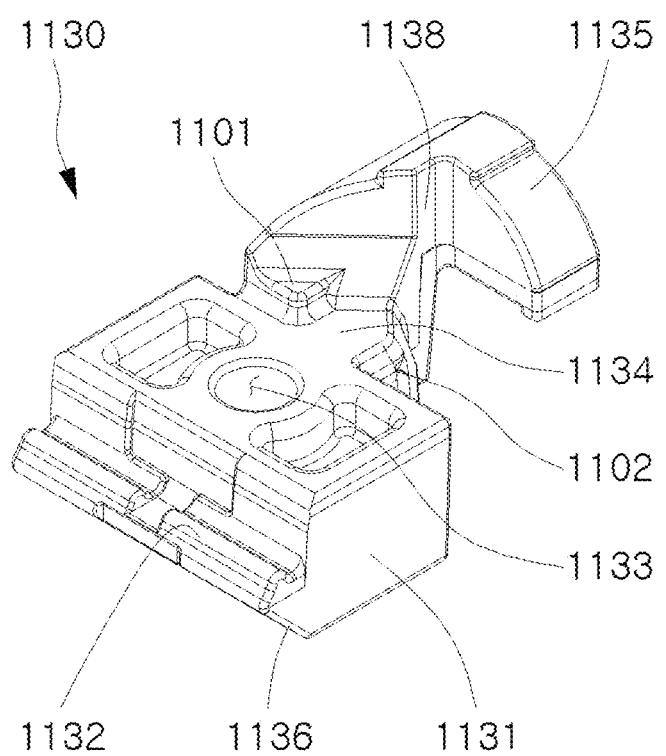
FIG. 21 is a bottom perspective view illustrating a rack pipe connecting joint member of a planar exterior pipe rack system according to an eleventh embodiment of the present disclosure.

FIG. 21 is a bottom perspective view illustrating a rack pipe connecting joint member of a planar exterior pipe rack system according to an eleventh embodiment of the present disclosure.

Referring to FIG. 21, in the present embodiment, an engagement protrusion 1101 protrudes a predetermined height from a corner of a portion where a pipe insertion extension 1134 and a joint member body 1131 are connected. An engagement recess 1102 is recessed a predetermined depth into a corner of a portion where the pipe insertion extension 1134 and the joint member body 1131 are connected.

When a pair of rack pipe connecting joint members 1130 are engaged with each other, the engagement protrusion 1101 of one of the pair of rack pipe connecting joint members 1130 is inserted into and engaged with the engagement recess 1102 of the other of the pair of rack pipe connecting joint members 1130. Consequently, the pair of rack pipe connecting joint members 1130 may be in contact with each other in a correct position. In addition, the pair of rack pipe connecting joint members 1130 in contact with each other may be prevented from being freely shaken by external force.

While the specific exemplary embodiments of the present disclosure have been illustrated and described, it will be apparent to those having ordinary skill in the art that many modifications and variations are possible without departing from spirits and scopes of the present disclosure defined by appended claims. It is definitely noted that such modifications and variations are included within the scope of the present disclosure.

INDUSTRIAL APPLICABILITY

According to planar exterior pipe rack system, as well as the planar exterior forming rectangular rack pipe and the rack pipe connecting rectangular joint constituting the planar exterior pipe rack system, the outer surface of a rack pipe may be formed as a planar surface in a simple manner, foreign matter may be blocked, and the strength of the rack pipe may be relatively increased due to the exterior thereof, as compared to a related-art rack pipe having a curved outer shape. Therefore, the present disclosure is regarded as having high industrial applicability.

The invention claimed is:

1. A planar exterior forming rectangular rack pipe constituting a planar exterior pipe rack system used to provide an industrial structure in a prefabricated manner and couplable to a rack pipe connecting rectangular joint to provide the industrial structure, the planar exterior forming rectangular rack pipe comprising:
a rack pipe body comprising a skeleton of the industrial structure and having non-planar outer surfaces;
a plurality of joint coupling protrusions protruding outward from the rack pipe body to be coupled to the rack pipe connecting rectangular joint; and
plane forming portions extending from the joint coupling protrusions such that at least one portion of the rack pipe body has a planar outer surface,
wherein, when the rack pipe connecting rectangular joint is coupled with at least one of the joint coupling protrusions and the rack pipe body, the rack pipe connecting rectangular joint and the plane forming portions are connected to each other and form a planar surface,
wherein the plane forming portions comprise:
a first plane forming portion extending from a top portion of one of an adjacent pair of joint coupling protrusions among the plurality of joint coupling protrusions, and
a second plane forming portion extending from a top portion of an other of the adjacent pair of joint coupling protrusions among the plurality of joint coupling protrusions,
wherein outer surfaces of the first plane forming portion and the second plane forming portion are coplanar with an outer surface of the joint coupling protrusions, the first plane forming portion and the second plane forming portion perpendicularly join each other and cover a portion of an area above the rack pipe body so that the joint coupling protrusions together with the first plane forming portion and the second plane forming portion form two perpendicularly-connected surfaces, such that planar surfaces are formed on a part of the outer surfaces of the rack pipe body,
wherein a first planar opposite extension and a second planar opposite extension extend from the joint coupling protrusions in a form of planar surfaces, in directions opposite to directions in which the first plane forming portion and the second plane forming portion extend,
wherein the first planar opposite extension and the first plane forming portion are coplanar with outer surfaces of the joint coupling protrusions, from which the first planar opposite extension and the first plane forming portion extend, to entirely cover the rack pipe body,
wherein the second planar opposite extension and the second plane forming portion are coplanar with the outer surfaces of the joint coupling protrusions, from which the second planar opposite extension and the second plane forming portion extend, to entirely cover the rack pipe body, and
wherein a first body-directed extension and a second body-directed extension extend in a form of planar surfaces from distal ends of the first planar opposite extension and the second planar opposite extension in directions toward a center of the rack pipe body to join the outer surfaces of the rack pipe body, respectively, and the first body-directed extension and the second body-directed extension contact inclined outer surfaces of clamping portions of the rack pipe connecting rectangular joint, such that the rack pipe connecting rectangular joint and the planar exterior forming rectangular rack pipe contact each other.

2. A planar exterior forming rectangular rack pipe constituting a planar exterior pipe rack system used to provide an industrial structure in a prefabrication manner and couplable to a rack pipe connecting rectangular joint to provide the industrial structure, the planar exterior forming rectangular rack pipe comprising:
a rack pipe body comprising a skeleton of the industrial structure and having non-planar outer surfaces,
a plurality of joint coupling protrusions protruding outward from the rack pipe body to be coupled to the rack pipe connecting rectangular joint,
plane forming portions extending from the joint coupling protrusions such that at least one portion of the rack pipe body has a planar outer surface, and
linear object covers are detachably coupled to the joint coupling protrusions to cover a linear object arranged in a longitudinal direction of the planar exterior forming rectangular rack pipe,
wherein, when the rack pipe connecting rectangular joint is coupled with at least one of the joint coupling protrusions and the rack pipe body, the rack pipe connecting rectangular joint and the plane forming portions are connected to each other and form a planar surface,
wherein the linear object cover comprises:
a cover body covering the linear object,
cover body edge outer portions bent outward from both edges of the cover body, and
cover body protrusions protruding outward from both edges of the cover body so as to be spaced apart by predetermined heights from the cover body edge outer portions, and
wherein, when in use, inserting the joint coupling protrusions into a space between the cover body edge outer portions and the cover body protrusions detachably couples the linear object cover to the joint coupling protrusions.

* * * * *